(12) United States Patent
Wang et al.

(10) Patent No.: US 9,785,157 B2
(45) Date of Patent: Oct. 10, 2017

(54) METHOD FOR CONTROLLING CIRCUIT MODULES WITHIN CHIP AND ASSOCIATED SYSTEM ON CHIP

(71) Applicant: MEDIATEK INC., Hsin-Chu (TW)

(72) Inventors: Wei-Ting Wang, Taipei (TW); Chia-Feng Yeh, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 5 days.

(21) Appl. No.: 14/863,426

(22) Filed: Sep. 23, 2015

(65) Prior Publication Data

US 2016/0291665 A1    Oct. 6, 2016

Related U.S. Application Data

(60) Provisional application No. 62/140,453, filed on Mar. 30, 2015.

(51) Int. Cl.
| | |
|---|---|
| *G06F 1/00* | (2006.01) |
| *G06F 1/28* | (2006.01) |
| *G05D 23/19* | (2006.01) |
| *G06F 1/20* | (2006.01) |
| *G06F 1/32* | (2006.01) |

(52) U.S. Cl.
CPC ......... *G05D 23/1917* (2013.01); *G06F 1/206* (2013.01); *G06F 1/325* (2013.01); *G06F 1/3209* (2013.01); *G06F 1/329* (2013.01); *G06F 1/3215* (2013.01); *Y02B 60/144* (2013.01)

(58) Field of Classification Search
CPC ........ G06F 1/28; G06F 1/324; G05D 23/1917
See application file for complete search history.

(56) References Cited

U.S. PATENT DOCUMENTS

| | | | | |
|---|---|---|---|---|
| 7,328,355 | B2 * | 2/2008 | Arakawa | G06F 1/3203 |
| | | | | 713/300 |
| 7,464,277 | B2 * | 12/2008 | Prosperi | G06F 1/3203 |
| | | | | 713/300 |
| 7,783,903 | B2 * | 8/2010 | Piazza | G06F 1/3203 |
| | | | | 361/679.46 |
| 7,860,018 | B2 | 12/2010 | Raith | |
| 8,201,416 | B2 * | 6/2012 | Liao | G05D 23/1931 |
| | | | | 165/104.33 |
| 2013/0246820 | A1 * | 9/2013 | Branover | G06F 1/3296 |
| | | | | 713/320 |
| 2015/0286262 | A1 * | 10/2015 | Park | G05D 23/1917 |
| | | | | 713/320 |
| 2016/0026231 | A1 * | 1/2016 | Ignowski | G06F 1/206 |
| | | | | 713/320 |

\* cited by examiner

*Primary Examiner* — Mark Connolly
(74) *Attorney, Agent, or Firm* — Winston Hsu (57) ABSTRACT

A method for controlling circuit modules within a chip is provided, wherein the circuit modules includes at least one processor and at least one network module, and the method includes: obtaining a plurality of temperature-related information of the circuit modules; and allocating power limits or throughput limits of the circuit modules according to the temperature-related information of the circuit modules, respectively.

15 Claims, 8 Drawing Sheets

| Allocation strategy | Priority | Scenario |
|---|---|---|
| Temperature threshold setting | The levels of temperature thresholds mean the resource priority | By demands |
| Network module last | CPU/GPU > WiFi (modem) | WiFi tethering (hotspot) + other scenarios |
| Network module first | WiFi (modem) > CPU/GPU | WiFi display (P2P) |
| Fixed performance ratio | CPU/GPU OPP to WiFi(modem) throughput | By demands |
| Fixed power ratio | CPU/GPU power to WiFi(modem) power | By demands |

| Allocation strategy | Priority | Scenario |
|---|---|---|
| Temperature threshold setting | The levels of temperature thresholds mean the resource priority | By demands |
| Network module last | CPU/GPU > WiFi (modem) | WiFi tethering (hotspot) + other scenarios |
| Network module first | WiFi (modem) > CPU/GPU | WiFi display (P2P) |
| Fixed performance ratio | CPU/GPU OPP to WiFi(modem) throughput | By demands |
| Fixed power ratio | CPU/GPU power to WiFi(modem) power | By demands |

METHOD FOR CONTROLLING CIRCUIT MODULES WITHIN CHIP AND ASSOCIATED SYSTEM ON CHIP

CROSS REFERENCE TO RELATED APPLICATIONS

This application claims the priority of U.S. Provisional Application No. 62/140,453, filed on Mar. 30, 2015, which is included herein by reference in its entirety.

BACKGROUND

Recently, a plurality of processors such as central processing unit (CPU) and graphics processing unit (GPU) and a plurality of network modules such as WiFi module and modulator-demodulator (modem) are integrated into a chip to save the manufacturing cost . However, each of the processors and the network modules can be regarded as a heat source, and because distances between the processors and the network modules are closer (within a chip), the temperature coupling effect is bigger, and the junction temperatures of the processors and the network modules become difficult to estimate and control. Also, it is more difficult to allocate resources among processor and networking module if there are different power control interface. Therefore, how to provide a method to manage thermal issues of the processors and the network modules is an important topic.

SUMMARY

It is therefore an objective of the present invention to provide a method for controlling circuit modules within a chip and associated system on chip, which has different strategies for resource allocation and flexible temperature constraint setting, to solve the above-mentioned problems.

According to one embodiment of the present invention, a method for controlling circuit modules within a chip is disclosed, wherein the circuit modules comprise at least one processor and at least one network module, and the method comprises: obtaining a plurality of temperature-related information of the circuit modules; and allocating power limits or throughput limits of the circuit modules according to the temperature-related information of the circuit modules, respectively.

According to another embodiment of the present invention, a system on chip comprises a plurality of circuit modules and an allocator, where the circuit modules comprise at least one processor and at least one network module. The allocator is arranged for obtaining a plurality of temperature-related information of the circuit modules, and allocating power limits or throughput limits of the circuit modules according to the temperature-related information of the circuit modules, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
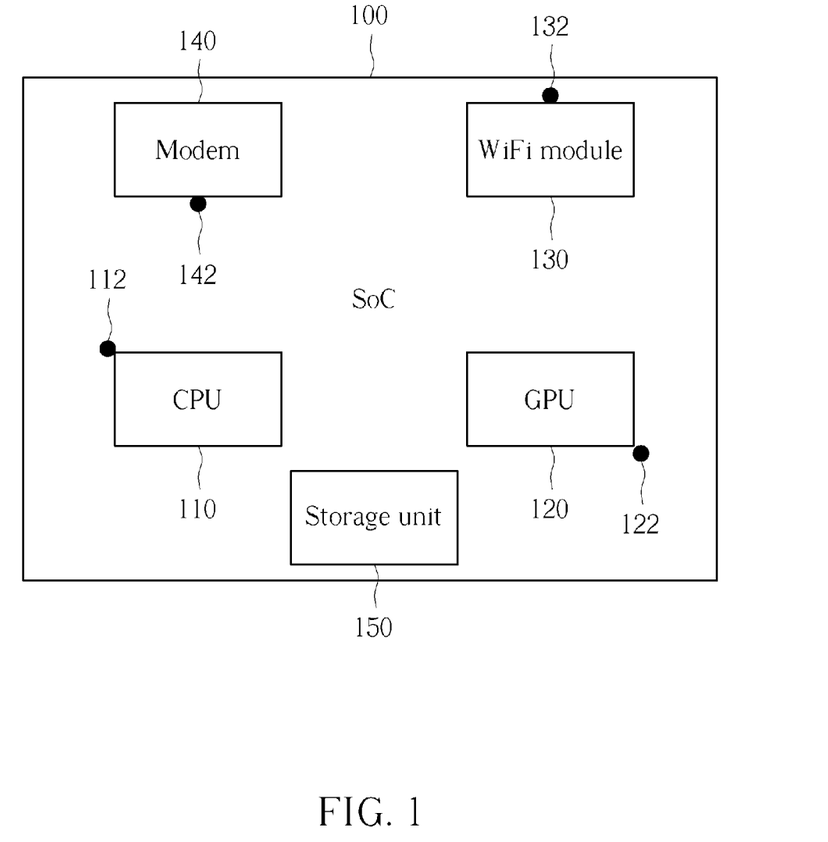
FIG. 1 is a diagram illustrating a system on chip (SoC) according to one embodiment of the present invention.

Please refer to FIG. 1, which is a diagram illustrating a system on chip (SoC) 100 according to one embodiment of the present invention, where the SoC 100 may be applied to any electronic device such as a smart phone or a tablet. As shown in FIG. 1, the SoC 100 comprises a plurality of circuit modules and a storage unit 150, where in this embodiment, the circuit modules comprises two processors, CPU 110 and GPU 120, and two network modules, WiFi module 130 and modem 140. In addition, the SoC 100 further comprises four temperature sensors 112, 122, 132 and 142 for sensing temperatures of CPU 110, GPU 120, WiFi module 130 and modem 140, respectively. In this embodiment, the CPU 110 and GPU 120 may have one or more cores, and each of the WiFi module 130 and the modem 140 have radio frequency (RF) portion, power amplifier (PA) portion and digital portion. In addition, in an alternative embodiment, the SoC 100 may further have other network modules such as Global Positioning System (GPS) module, Bluetooth module, FM radio and/or Near Field Communication (NFC) module, and the SoC 100 may further have other processors such as digital signal processor (DSP) core, microcontroller unit (MCU) or multimedia module (MM) (not shown).

Figure 2:
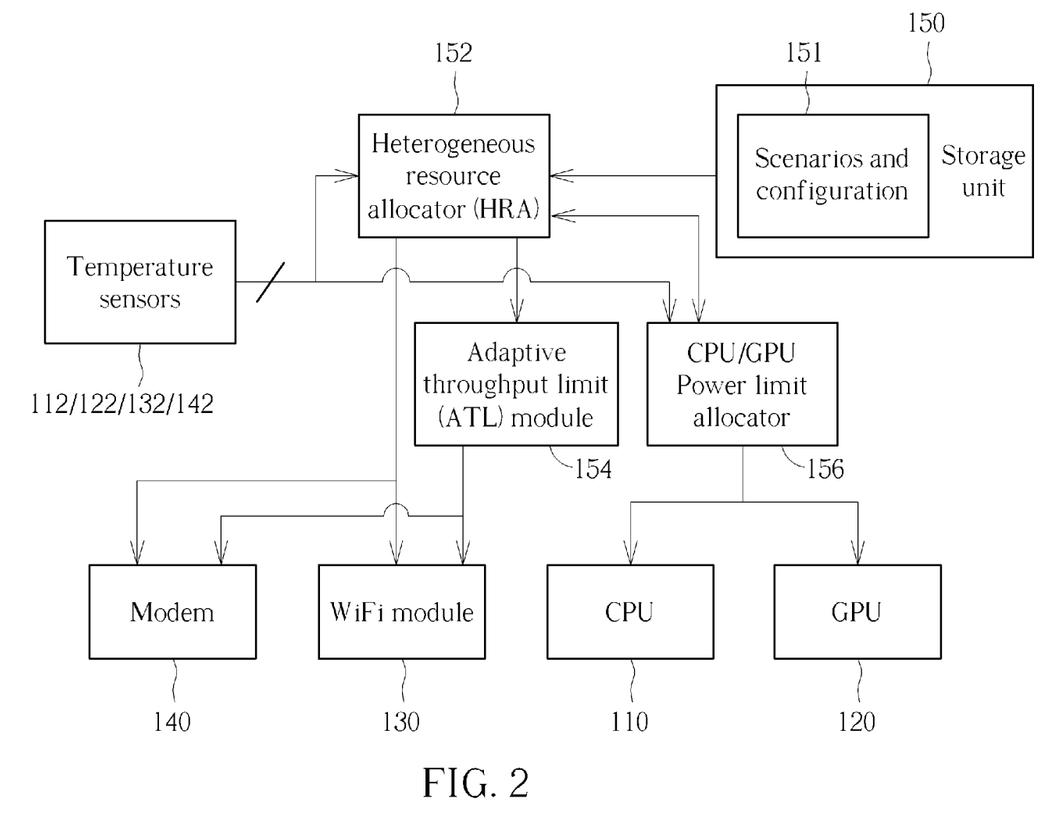
FIG. 2 is a diagram illustrating a detailed structure of the SoC according to one embodiment of the present invention.

FIG. 2 is a diagram illustrating a detailed structure of the SoC 100 according to one embodiment of the present invention. As shown in FIG. 2, the SoC 100 further comprises a storage unit 150 storing scenarios and configurations 151, a heterogeneous resource allocator (HRA) 152, an adaptive throughput limit (ATL) module 154 and a CPU/GPU power limit allocator 156. In this embodiment, the scenarios and configurations 151 is used to provide associated setting to the HRA 152, where the associated setting may comprise allocation strategies, temperature-related setting, throughput limit ratio, target temperature, or WiFi/modem related index described in the following description; the HRA 152 receives the temperatures (junction temperatures) of the CPU 110, GPU 120, WiFi module 130 and modem 140 provided by the temperature sensors 112, 122, 132 and 142 and the power limits of the CPU 110 and GPU 120 provided by the CPU/GPU power limit allocator 156, and the HRA 152 controls the power limits of the CPU 110 and GPU 120 and the throughputs of the WiFi module 130 and the modem 140 according to the received information; the ATL module 154 is arranged to receive the control setting provided by the HRA 152 to control the throughput of the WiFi module 130 and modem 140; and the CPU/GPU power limit allocator 156 is arranged to receive the temperatures of the CPU 110 and GPU 120 provided by the temperature sensors 112 and 122 and the control setting provided by the HRA 152 to control the power of the CPU 110 and GPU 120 (e.g. Dynamic voltage and frequency scaling (DVFS) control).

Furthermore, in this embodiment, the HRA 152 determines an allocating strategy according a scenario of the electronic device, and uses the allocating strategy to control the power limits of the CPU 110 and GPU 120 and the throughputs of the WiFi module 130 and the modem 140. The above-mentioned scenario of the electronic device may be a wireless local area network (WLAN) link status (e.g. legacy, P2P or hotspot) or applications (e.g. concurrent task scenarios such as video playing by CPU/GPU and WiFi tethering by WiFi module).

Figure 3:
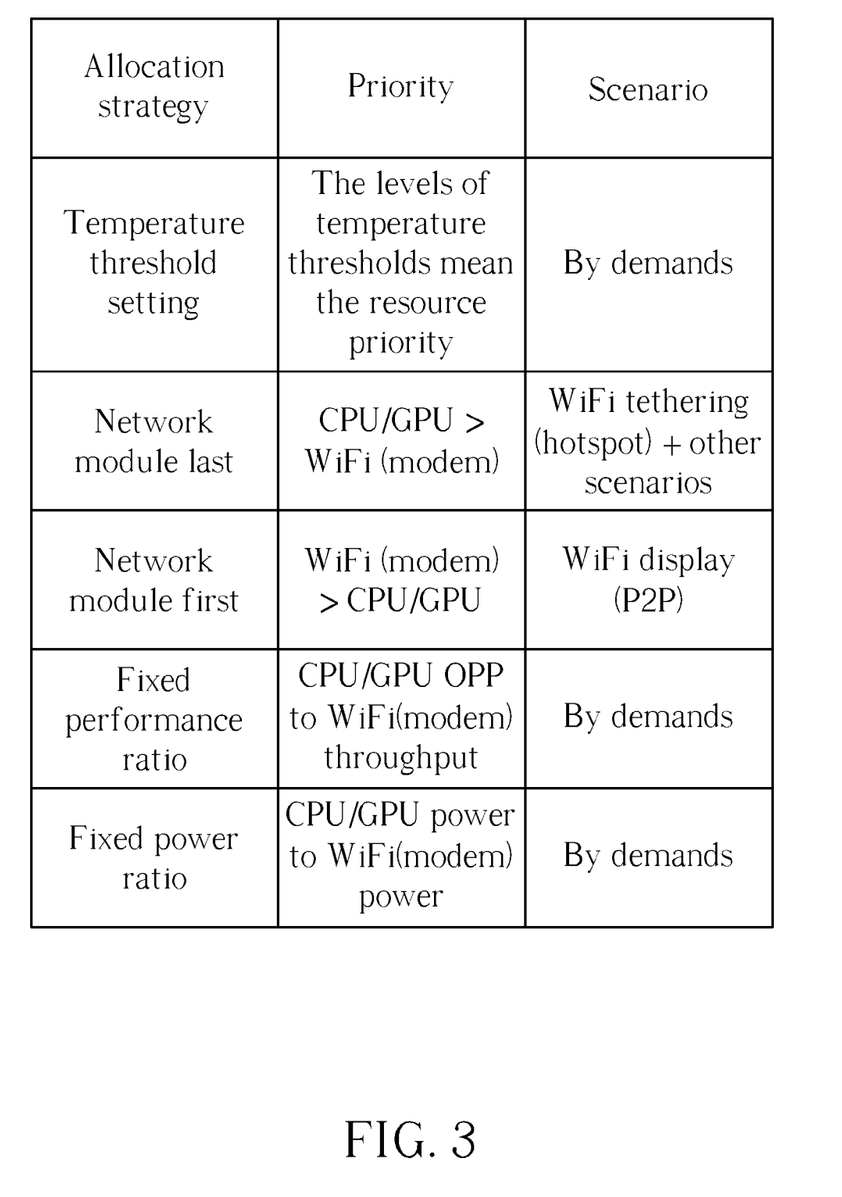
FIG. 3 is a diagram illustrating HRA allocation strategies according to one embodiment of the present invention.

Refer to FIG. 3, which is a diagram illustrating allocation strategies of the HRA 152 according to one embodiment of the present invention. As shown in FIG. 3, five allocation strategies are provided as examples, the first allocation strategy is a temperature threshold setting strategy, the second allocation strategy is the network module last strategy (WiFi last strategy), the third allocation strategy is the network module first strategy (WiFi first strategy), the fourth allocation strategy is a fixed performance ratio strategy, and the fifth allocation strategy is a fixed power ratio strategy. The fixed power ratio strategy is performed when the WiFi module 130 or the modem 140 has its own power model (for example, the supplied power could be quantized by the power model with a formula or a table); and the other four strategies (the temperature threshold setting strategy, the WiFi last strategy, the WiFi first strategy and the fixed performance strategy) can be performed when the WiFi module 130 or the modem 140 does not have its own power model. The detail of these allocation strategies are described as follows.

Figure 4A:
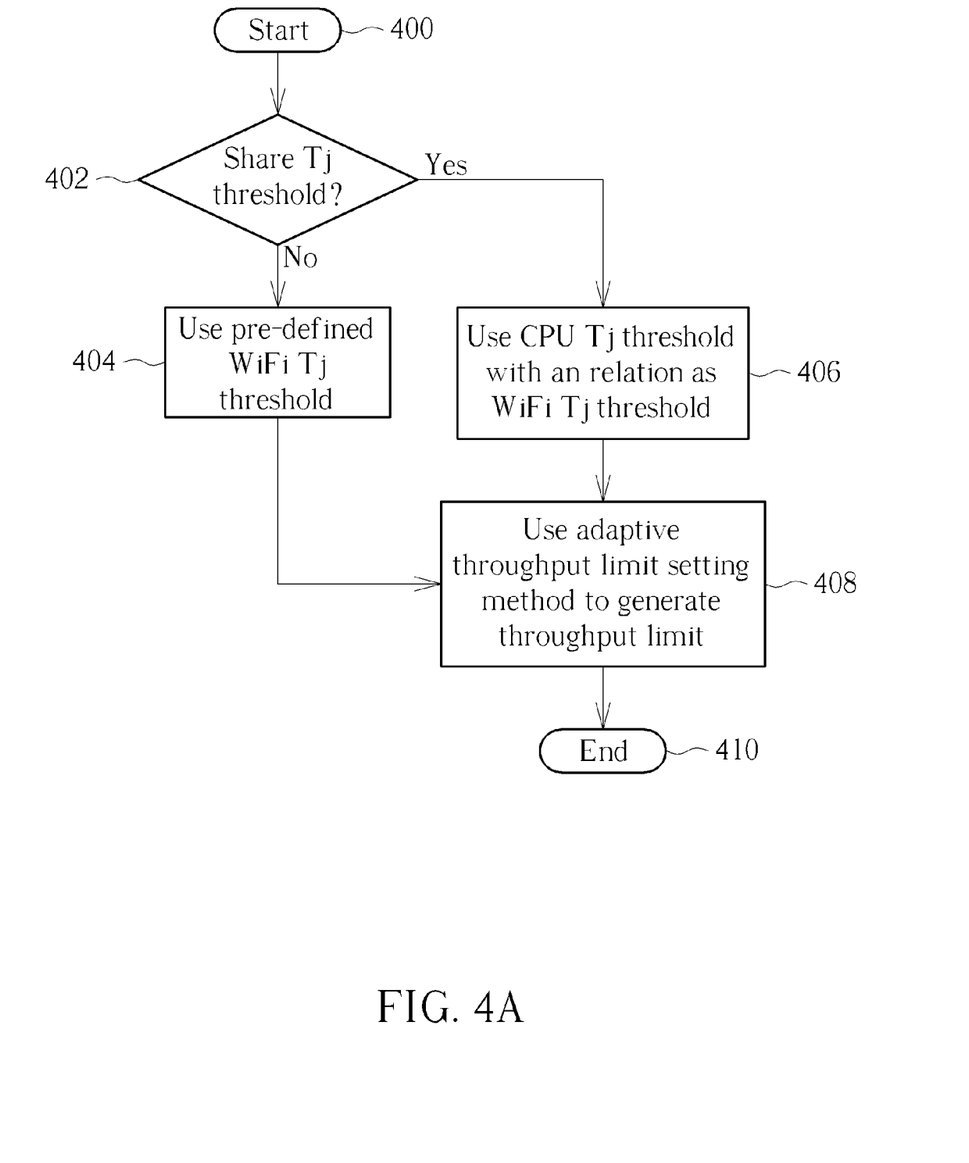
FIG. 4A is a flowchart of the temperature threshold setting strategy according to one embodiment of the present invention.

Refer to FIG. 4A, which is a flowchart of the temperature threshold setting strategy according to one embodiment of the present invention. In Step 400, the flow starts. In Step 402, the HRA 152 determines whether the junction temperature thresholds (hereinafter, Tj threshold) of the circuit modules are shared or not, in this embodiment, the HRA 152 determines whether the Tj threshold of the WiFi module 130 is shared with the Tj threshold of the CPU 110. If not, the flow enters Step 404 to use the pre-defined WiFi Tj threshold as the determined Tj threshold of the WiFi module 130, that is the setting of the WiFi Tj threshold is independent from the Tj threshold of the other circuit modules; and if yes, the flow enters Step 406 to use the Tj threshold of the CPU 110 with a relation as the determined Tj threshold of the WiFi module 130, where the relation may be an offset, ratio or proportion. In Step 406, the relation can be assumed as an offset, if the CPU Tj threshold is 60° C., the WiFi Tj threshold may be 55° C. (offset=(−5)), which means that the CPU priority is higher than the WiFi priority; on the other hand, if the CPU Tj threshold is 60° C., the WiFi Tj threshold may be 65° C., (offset=5), which means that the CPU priority is lower than the WiFi priority.

In Step 408, the HRA 152 uses the ATL module 154 to generate the throughput limit of the WiFi module 130. In one embodiment, the HRA 152 or the ATL module 154 may adaptively set the throughput limit of the WiFi module 130 according to a difference between the current temperature of the WiFi module 130 (provided by temperature sensor 132) and the determined Tj threshold. In detail, refer to FIG. 4B, which is a flowchart of the adaptive throughput limit setting method according to one embodiment of the present invention. In Step 450, the flow starts. In Step 452, the ATL module 154 determines if the current junction temperature Tj sensed by the temperature sensor 132 is greater than the Tj threshold. If not, the flow enters Step 458 to finish the flow; if yes, the flow enters Step 454 to calculate the difference between the current junction temperature Tj of the WiFi module 130 and the determined Tj threshold. In Step 456, the ATL module 154 generates the throughput limit according to the difference. In detail, if the difference is small, the ATL module 154 may generate the higher throughput limit; and if the difference is large, the ATL module 154 may generate the lower throughput limit. Finally, the flow enters Step 458 to finish the flow.

It is noted that although FIG. 4A only use the CPU 110 and the WiFi module 130 to describe the temperature threshold setting strategy, a person skilled in the art should understand how to apply this technique to other circuit modules. Briefly summarized, in the temperature threshold setting strategy shown in FIG. 4A, the HRA 152 may set the Tj thresholds of the CPU 10, GPU 120, WiFi module 130 and modem 140 independently or based on the resource priority, then the HRA 152 may independently allocate the power limit or the throughput of the CPU 10, GPU 120, WiFi module 130 and modem 140 according to the temperatures sensed by temperature sensors 112, 122, 132 and 142 and the Tj thresholds, respectively, where the power limit or the throughput limit of each circuit module may be adaptively determined according to current temperature and the corresponding Tj threshold.

In the temperature threshold setting strategy, each of the circuit module performs the thermal throttling by referring to its own temperature or related information, instead of referring to the temperatures of the other circuit modules. For example, in FIG. 4B, the throughput limit of the WiFi module 130 is determined based on the temperature difference between Tj sensed by the temperature sensor 132 and the Tj threshold only.

Figure 4B:
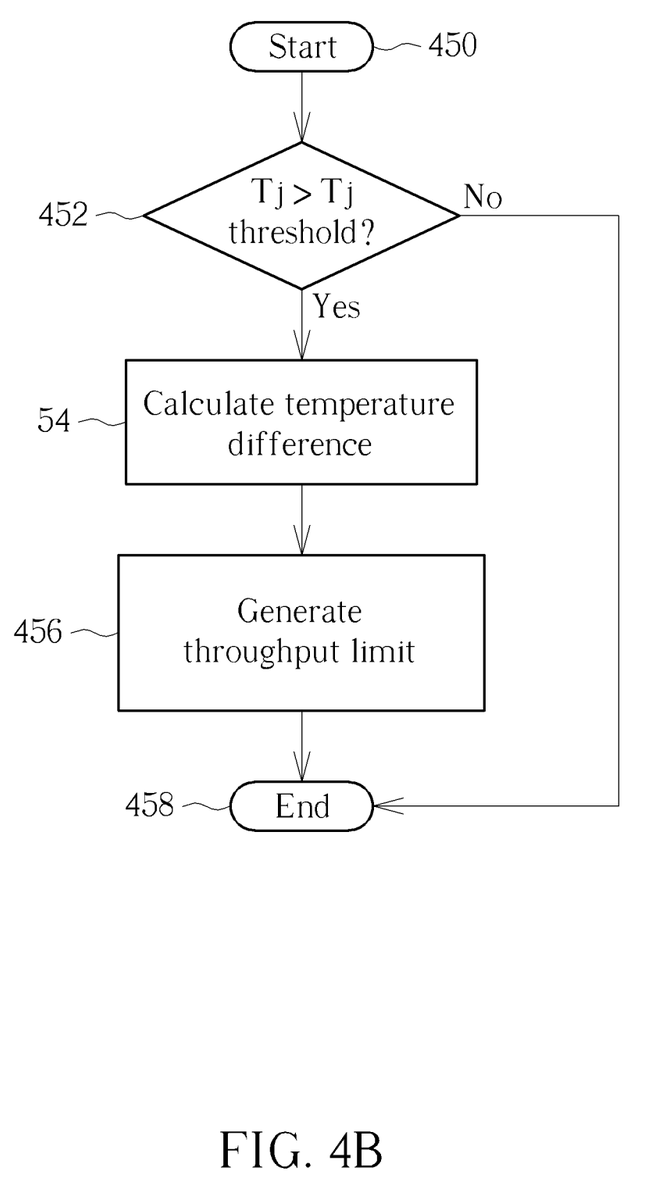
FIG. 4B is a flowchart of the adaptive throughput limit setting method according to one embodiment of the present invention.

In addition, in the embodiments shown in FIGS. 4A and 4B, the junction temperature Tj (i.e. the die function temperature sensed by the on-chip thermal sensor) is used in the flow, in other embodiments, however, the junction temperature Tj may be replaced by other temperature such as temperature of the printed circuit board (PCB), where the PCB temperature may be used to monitor the skin temperature.

In addition, in FIG. 4B, the thermal control or the throughput control starts when the junction temperature Tj is greater than the Tj threshold, in other embodiments, however, the start point and the finish point of the thermal control or the throughput control may be different. For example, the thermal control or the throughput control (e.g. fixed power setting) starts when the junction temperature Tj is greater than 80° C., and the thermal control or the throughput control is finished when the junction temperature Tj is lower than 60° C. For another example, the thermal control or the throughput control starts when the junction temperature Tj is greater than 80° C., and uses the adaptive throughput limit setting to control the junction temperature Tj not greater than 80° C., and the thermal control or the throughput control is finished when the junction temperature Tj is lower than 60° C. For yet another example, the thermal control or the throughput control starts when the junction temperature Tj is greater than 70° C., and uses the adaptive throughput limit setting to control the junction temperature Tj not greater than 80° C., and the thermal control or the throughput control is finished when the junction temperature Tj is lower than 60° C. These alternative designs shall fall within the scope of the present invention.

Figure 5:
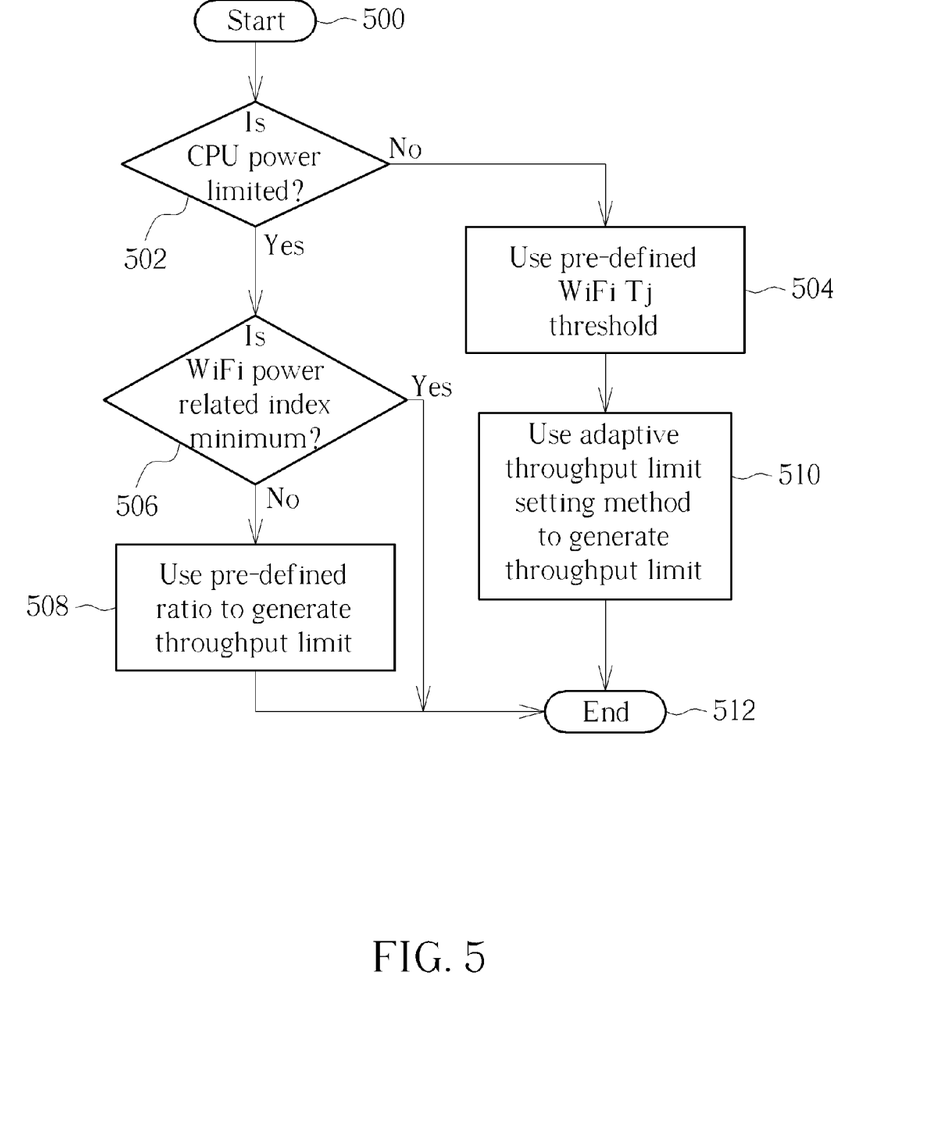
FIG. 5 is a flowchart of the network module last strategy according to one embodiment of the present invention.

Refer to FIG. 5, which is a flowchart of the network module last strategy according to one embodiment of the present invention, and here takes WiFi as an example of the network module. In Step 500, the flow starts. In Step 502, the HRA 152 determines if the power of the CPU 110 is limited. If not, the flow enters Step 504 to use the pre-defined WiFi Tj threshold as the determined Tj threshold of the WiFi module 130; if yes, the flow enters Step 506. In Step 506, the HRA 152 determines if the WiFi power related index is a minimum value, if yes, the flow enters Step 512 to finish the flow; if not, the flow enters Step 508 to use the pre-defined ratio to generate a new throughput limit. For example, the pre-defined ratio may be 60%, that is the new throughput limit is sixty percent of the current throughput limit. In addition, the aforementioned "WiFi power related index" may be the throughput or the power of the WiFi module, which can be estimated by software calculation or hardware power meter.

In Step 510, the HRA 152 uses the ATL module 154 to generate the throughput limit of the WiFi module 130. In one embodiment, the HRA 152 or the ATL module 154 may adaptively set the throughput limit of the WiFi module 130 according to a difference between the current temperature of the WiFi module 130 (provided by temperature sensor 132) and the determined Tj threshold. The detailed operation of the adaptive throughput limit setting operation can refer to FIG. 4B mentioned above.

It is noted that although FIG. 5 only use the CPU 110 and the WiFi module 130 to describe the WiFi last strategy, a person skilled in the art should understand how to apply this technique to other circuit modules. Briefly summarized, in the WiFi last strategy shown in FIG. 5, if the power of CPU 110 or GPU 120 is limited (that may be implied that the CPU 110 or GPU 120 is overheated), the throughput limit of the WiFi module 130 is enforced to be decreased to lower the temperature of the WiFi module 130, thereby avoid the temperature increase of the CPU 110 or GPU 120 due to the temperature-coupling effect.

Figure 6:
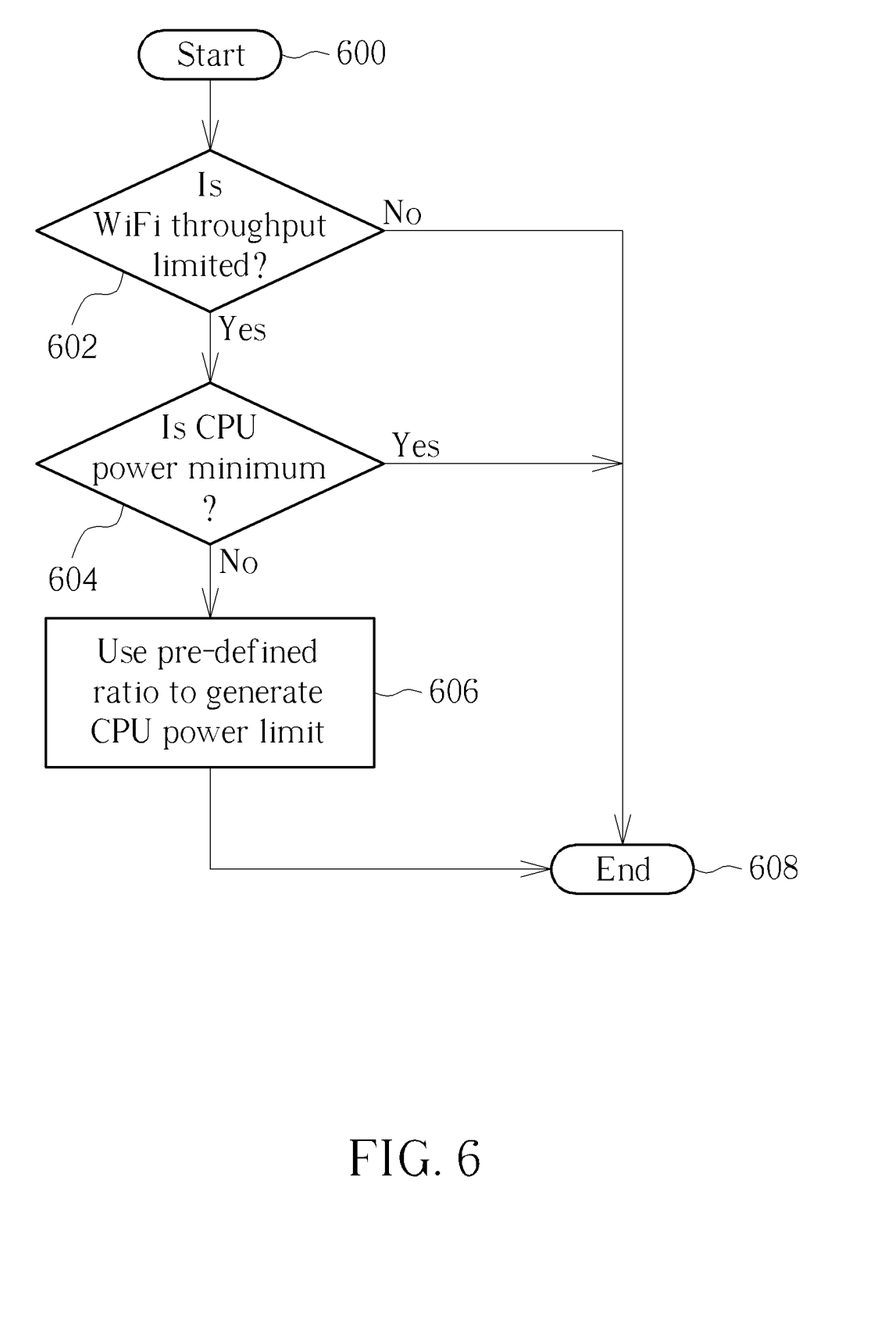
FIG. 6 is a flowchart of the network module first strategy according to one embodiment of the present invention.

Refer to FIG. 6, which is a flowchart of the network module first strategy according to one embodiment of the present invention, and here takes WiFi as an example of the network module. In Step 600, the flow starts. In Step 602, the HRA 152 determines if the throughput of the WiFi module 130 is limited. If not, the flow enters Step 608 to finish the flow; if yes, the flow enters Step 604. In Step 604, the HRA 152 determines if the CPU power is a minimum value, if yes, the flow enters Step 608 to finish the flow; if not, the flow enters Step 606 to use the pre-defined ratio to generate a new power limit. For example, the pre-defined ratio may be 40%, that is the new power limit is forty percent of the current power limit.

It is noted that although FIG. 6 only use the CPU 110 and the WiFi module 130 to describe the WiFi first strategy, a person skilled in the art should understand how to apply this technique to other circuit modules. Briefly summarized, in the WiFi first strategy shown in FIG. 6, if the throughput of the WiFi module 130 is limited (that may be implied that the WiFi module 130 is overheated), the power limit of the CPU 110 is enforced to be decreased to lower the temperature of the CPU 110, thereby avoid the temperature increase of the WiFi module 130 due to the temperature-coupling effect.

In the fixed performance ratio strategy, there is a fixed ratio between the operating performance point (OPP) limit of the CPU 110 or GPU 120 and the throughput limit of the WiFi module 130 or the modem 140, where the OPP may be one of the power, supply voltage or clock frequency of the CPU 110 or GPU 120. The HRA 152 will set the throughput limit of the WiFi module 130 or the modem 140 according to this ratio.

In the fixed power ratio strategy, there is a fixed ratio between the power limit of the CPU 110 or GPU 120 and the power limit of the WiFi module 130 or the modem 140. The HRA 152 will set the power limit of the WiFi module 130 or the modem 140 according to this ratio.

In addition, for the user experience on concurrent task scenarios, e.g., consists of video playing by the CPU 110 and GPU 120 and WiFi tethering by the WiFi module 130 and modem 140, under a power limit of the SoC 100 under skin temperature constraint, because the power limit of the CPU 110 and GPU 120 is shared by the WiFi module 130 and modem 140 serving as heat sources, the performance of the CPU 110 and GPU 120 may be limited. Therefore, to avoid the degradation of the performance of the CPU 110 and GPU 120 on the concurrent task scenarios, the following embodiment provide a thermal management method that allows a higher skin temperature constraint on concurrent task scenarios.

Figure 7:
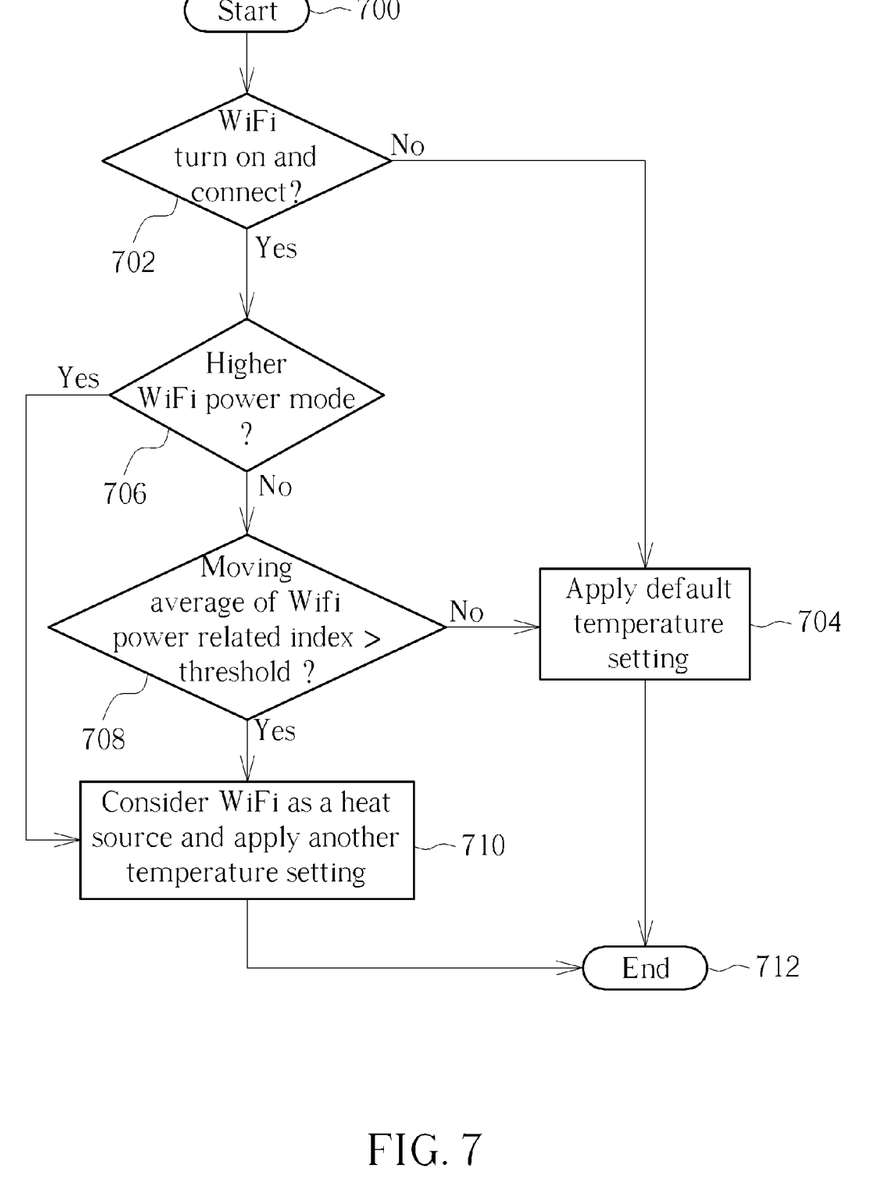
FIG. 7 is a flowchart of a method for controlling the circuit modules according to one embodiment of the present invention.

Refer to FIG. 7, which is a flowchart of a method for controlling the circuit modules according to one embodiment of the present invention. As shown in FIG. 7, in Step 700, the flow starts. In Step 702, the HRA 152 determines if the WiFi module 130 is turned on and connected? If yes, the flow enters Step 706; if not, the flow enters Step 704 to apply a default skin temperature constraint setting. In Step 706, the HRA 152 determines if the WiFi module 130 operates in a high power mode such as P2P or hotspot? If yes, the flow enters Step 710; if not, the flow enters Step 708. In Step 708, the HRA 152 determines if the moving average of the WiFi power related index in greater than a threshold? If yes, the flow enters Step 710; if not, the flow enters Step 704 to apply the default skin temperature constraint setting. In Step 710, the WiFi module 130 is considered as a heat source, and the HRA 152 applies another skin temperature constraint setting.

In this embodiment, the "WiFi power related index" may be the throughput or the power of the WiFi module, which can be estimated by software calculation or hardware power meter. In addition, the another skin temperature constraint setting may be greater than default skin temperature constraint setting, for example, the another skin temperature constraint setting may be 45° C., and the default skin temperature constraint setting may be 40° C. Because the skin temperature of the electronic device and each of the junction temperatures of the CPU 110, GPU 120, WiFi module 130 and the modem 140 have a relationship, therefore, the HRA 152 may re-set the junction temperature (Tj) threshold according to the new skin temperature constraint setting to allow the CPU 110, GPU 120, WiFi module 130 and the modem 140 have the higher throughput/power limit (i.e. higher temperature).

It is noted that the "temperatures" sensed by the temperatures 112/122/132/142 for use in the above embodiments can be replaced by other temperature-related information that has positive relation with the temperature, such as performance indexes, powers, data rates or throughputs. In addition, the WiFi module 130 and the CPU 110 are provided as examples in FIGS. 4A-7 and the related embodiments, however, in other embodiments, the WiFi module 130 described in FIGS. 4A-7 may be replaced by the other network module such as the modem 140, Bluetooth module (not shown), . . . and so on. The CPU 110 described in FIGS. 4A-7 may be replaced by the other processor such as the GPU 120, DSP module (not shown), . . . and so on.

Briefly summarized, in the method for controlling circuit modules within a chip and associated system on chip of the present invention, there are different strategies for resource allocation are applied according to the scenarios of the electronic device. Furthermore, a flexible temperature constraint setting method is provided for single/concurrent task scenarios.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling circuit modules within a chip, wherein the circuit modules comprise at least one processor and at least one network module, and the method comprises:
    obtaining a plurality of temperature-related information of the circuit modules; and
    allocating power limits or throughput limits of the circuit modules according to the temperature-related information of the circuit modules, respectively;
    wherein the method is applied to an electronic device comprising the chip, and the step of allocating the power limits or the throughput limits of the circuit modules comprises:
        determining an allocating strategy according to a scenario of the electronic device;
        when the allocating strategy is determined as a network module last strategy, determining whether a power of the at least one processor is limited or not; and
        when the power of the at least one processor is limited, reducing the power limit or the throughput limit of the at least one network module.

2. The method of claim 1, wherein the step of obtaining the plurality of temperature-related information of the circuit modules comprises:
    obtaining the plurality of temperature-related information from a plurality of temperature sensors for sensing temperatures of the circuit modules, respectively.

3. The method of claim 1, wherein the plurality of temperature-related information of the circuit modules are performance indexes, powers, data rates, throughputs or temperatures of the circuit modules.

4. The method of claim 1, wherein when the allocating strategy is determined as a temperature threshold setting strategy, the method further comprises:
    setting a plurality of temperature thresholds for the circuit modules, respectively; and
    the step of allocating the power limits or the throughput limits of the circuit modules comprises:
        independently allocating the power limit or the throughput limit of each circuit module according to the corresponding temperature-related information and temperature threshold.

5. The method of claim 4, wherein the step of setting the plurality of temperature thresholds for the circuit modules, respectively, comprises:
    setting the temperature threshold of one of the circuit modules according to the temperature threshold of another one of the circuit modules.

6. The method of claim 1, wherein the temperature-related information are temperatures of the circuit modules, and the step of allocating the power limits or the throughput limits of the circuit modules further comprises:
    determining whether the temperature of the network module is greater than a temperature threshold;
    when the temperature of the network module is greater than the temperature threshold, calculating a difference between the temperature of the network module and the temperature threshold;
    determining a throughput limit according to the difference; and
    allocating the throughput limit for the network module.

7. The method of claim 1, wherein the at least one processor comprises a central processing unit (CPU), graphics processing unit (GPU), digital signal processor (DSP) core, microcontroller unit (MCU) or multimedia module; and wherein the at least one network module comprises a WiFi module, a modulator-demodulator (modem), Global Positioning System (GPS) module, Bluetooth module, FM radio, or Near Field Communication (NFC) module.

8. A method for controlling circuit modules within a chip, wherein the circuit modules comprise at least one processor and at least one network module, and the method comprises:
    obtaining a plurality of temperature-related information of the circuit modules; and
    allocating power limits or throughput limits of the circuit modules according to the temperature-related information of the circuit modules, respectively;
    wherein the method is applied to an electronic device comprising the chip, and the step of allocating the power limits or the throughput limits of the circuit modules comprises:
        determining an allocating strategy according to a scenario of the electronic device;
        when the allocating strategy is determined as a network module first strategy, determining whether the power or the throughput of the at least one network module is limited or not; and
        when the power or the throughput of the at least one network module is limited, reducing the power limit of the at least one processor.

9. A method for controlling circuit modules within a chip, wherein the circuit modules comprise at least one processor and at least one network module, and the method comprises:
    obtaining a plurality of temperature-related information of the circuit modules; and
    allocating power limits or throughput limits of the circuit modules according to the temperature-related information of the circuit modules, respectively;
    wherein the step of allocating the power limits or the throughput limits of the circuit modules according to the temperature-related information of the circuit modules, respectively, comprises:
        determining if the network module operates in a high power mode or if the power/throughput of the network module is greater than a threshold;
        when the network module does not operate in the high power mode or the power/throughput of the network module is not greater than the threshold, applying a first constraint setting to the network module; and when the network module operates in the high power mode or the power/throughput of the network module is greater than the threshold, applying a second constraint setting to the network module to allow the processor or the network module to have higher power/throughput limit than the first constraint setting;

wherein the first constraint setting and the second constraint setting are temperature thresholds of the network module, and the temperature threshold of the second constraint setting is greater than the temperature threshold of the first constraint setting.

10. A system on chip, comprising a plurality of circuit modules, wherein the circuit modules comprise at least one processor and at least one network module; and an allocator, arranged for obtaining a plurality of temperature-related information of the circuit modules; and allocating power limits or throughput limits of the circuit modules according to the temperature-related information of the circuit modules, respectively;

wherein the system on chip is applied to an electronic device, the allocator determines an allocating strategy according to a scenario of the electronic device; and when the allocating strategy is determined as a network module last strategy, the allocator determines whether a power of the at least one processor is limited or not; and when the power of the at least one processor is limited, reducing the power limit or the throughput limit of the at least one network module.

11. The system on chip of claim 10, further comprising:

a plurality of temperature sensors, arranged for sensing temperatures of the circuit modules, respectively, to generate the plurality of temperature-related information of the circuit modules.

12. The system on chip of claim 10, wherein when the allocating strategy is determined as a temperature threshold setting strategy, the allocator sets a plurality of temperature thresholds for the circuit modules, respectively; and independently allocates the power limit or the throughput limit of each circuit module according to the corresponding temperature-related information and temperature threshold.

13. The system on chip of claim 10, wherein the temperature-related information are temperatures of the circuit modules, and the allocator determines whether the temperature of the network module is greater than a temperature threshold; and when the temperature of the network module is greater than the temperature threshold, the allocator calculates a difference between the temperature of the network module and the temperature threshold, determines a throughput limit according to the difference, and allocates the throughput limit for the network module.

14. A system on chip, comprising a plurality of circuit modules, wherein the circuit modules comprise at least one processor and at least one network module; and an allocator, arranged for obtaining a plurality of temperature-related information of the circuit modules; and allocating power limits or throughput limits of the circuit modules according to the temperature-related information of the circuit modules, respectively;

wherein the allocator determines if the network module operates in a high power mode or if the power/throughput of the network module is greater than a threshold; and when the network module does not operate in the high power mode or the power/throughput of the network module is not greater than the threshold, the allocator applies a first constraint setting to the network module; and when the network module operates in the high power mode or the power/throughput of the network module is greater than the threshold, the allocator applies a second constraint setting to the network module to allow the processor or the network module to have higher power/throughput limit than the first constraint setting;

wherein the first constraint setting and the second constraint setting are temperature thresholds of the network module, and the temperature threshold of the second constraint setting is greater than the temperature threshold of the first constraint setting.

15. A system on chip, comprising a plurality of circuit modules, wherein the circuit modules comprise at least one processor and at least one network module; and an allocator, arranged for obtaining a plurality of temperature-related information of the circuit modules; and allocating power limits or throughput limits of the circuit modules according to the temperature-related information of the circuit modules, respectively;

wherein the system on chip is applied to an electronic device, the allocator determines an allocating strategy according to a scenario of the electronic device; and when the allocating strategy is determined as a network module first strategy, the allocator determines whether the power or the throughput of the at least one network module is limited or not; and when the power or the throughput of the at least one network module is limited, reducing the power limit of the at least one processor.

* * * * *